(12) United States Patent
Koohmarey et al.

(10) Patent No.: US 10,673,787 B2
(45) Date of Patent: Jun. 2, 2020

(54) VIRTUAL AGENT CONVERSATION SERVICE

(71) Applicant: ServiceNow, Inc., Santa Clara, CA (US)

(72) Inventors: Darius Koohmarey, Poway, CA (US); Anthony Arobone, San Diego, CA (US); John Oliver Mendoza, San Diego, CA (US); Gopalakrishnan Venkatachalam, San Diego, CA (US); Nathan Holm, San Diego, CA (US); Naitik Doshi, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 100 days.

(21) Appl. No.: 15/723,795

(22) Filed: Oct. 3, 2017

(65) Prior Publication Data

US 2019/0104092 A1    Apr. 4, 2019

(51) Int. Cl.
*H04L 12/58* (2006.01)
*G06Q 30/06* (2012.01)
*G06Q 30/02* (2012.01)
*G06F 40/30* (2020.01)

(52) U.S. Cl.
CPC .............. *H04L 51/02* (2013.01); *G06F 40/30* (2020.01); *G06Q 30/0203* (2013.01); *G06Q 30/0641* (2013.01); *H04L 51/18* (2013.01)

(58) Field of Classification Search
CPC ............... G06F 16/90332; G06F 3/167; G06F 3/04842; G06F 17/2785; G06F 17/279; G06F 9/453; G06F 17/28; G06F 19/326; G06Q 10/10; G06Q 30/016; G06Q 50/20; G06N 20/00

See application file for complete search history.

(56) References Cited

U.S. PATENT DOCUMENTS 8,346,563 B1 * 1/2013 Hjelm ................. G10L 15/1822
                                                          379/88.01
8,904,081 B1 * 12/2014 Kulkarni ............... G06F 3/0608
                                                          711/6
9,172,747 B2 * 10/2015 Walters .................. H04L 67/10
(Continued)

OTHER PUBLICATIONS

Extended European Search Report for European Application No. 18198149.9 dated Nov. 29, 2018; 9 pgs.
(Continued)

*Primary Examiner* — Ninos Donabed
(74) *Attorney, Agent, or Firm* — Fletcher Yoder PC (57) ABSTRACT

Techniques related to a virtual agent conversation service are disclosed. The techniques include a method for improving performance of a virtual agent conversation system, comprising receiving one or more conversation trees, receiving a message from a user including a natural language description of an intended task, providing the message to a conversation provider, receiving an indication of an intent of the message and textual information related to the indication of the intent, determining an action to take based on the indication of the intent, perform the action to obtain an action result, determining a set of responses based on the action result, and providing a response of the set of responses to the virtual agent based on the action result for output to the user.

18 Claims, 7 Drawing Sheets

(56) References Cited

U.S. PATENT DOCUMENTS

| | | | | |
|---|---|---|---|---|
| 9,223,537 | B2* | 12/2015 | Brown | G06F 3/165 |
| 9,367,244 | B2* | 6/2016 | Kulkarni | G06F 9/45554 |
| 9,542,930 | B2* | 1/2017 | Gupta | G06F 3/04815 |
| 10,049,152 | B2* | 8/2018 | Ajmera | G06F 16/3329 |
| 10,354,257 | B2* | 7/2019 | Walthers | G06F 17/2765 |
| 10,417,644 | B2* | 9/2019 | Walthers | G06Q 30/016 |
| 2010/0217759 | A1* | 8/2010 | Ma | G06F 16/2282 707/719 |
| 2012/0022927 | A1* | 1/2012 | Yankovich | G06Q 30/0252 705/14.5 |
| 2012/0022959 | A1* | 1/2012 | Yankovich | G06Q 30/0601 705/26.1 |
| 2012/0306741 | A1* | 12/2012 | Gupta | G06F 3/04815 345/156 |
| 2012/0317050 | A1* | 12/2012 | Bermuth | G06Q 10/06 705/348 |
| 2013/0268260 | A1* | 10/2013 | Lundberg | G06F 17/28 704/8 |
| 2014/0019116 | A1* | 1/2014 | Lundberg | G06F 17/28 704/8 |
| 2014/0244712 | A1* | 8/2014 | Walters | H04L 67/10 709/202 |
| 2014/0365223 | A1* | 12/2014 | Brown | G06F 17/28 704/270.1 |
| 2015/0089172 | A1* | 3/2015 | Kulkarni | G06F 3/0608 711/162 |
| 2016/0019290 | A1 | 1/2016 | Natnaparkhi et al. | |
| 2016/0062604 | A1 | 3/2016 | Kraljic et al. | |
| 2016/0071517 | A1* | 3/2016 | Beaver | G06F 17/279 704/9 |
| 2017/0054661 | A1* | 2/2017 | Golcher Barguil | H04L 51/046 |
| 2017/0078224 | A1* | 3/2017 | Chander | H04L 51/046 |
| 2017/0132199 | A1* | 5/2017 | Vescovi | G06F 3/04842 |
| 2017/0277993 | A1* | 9/2017 | Beaver | G06F 17/2785 |
| 2018/0322508 | A1* | 11/2018 | Walthers | G06Q 30/016 |
| 2018/0322509 | A1* | 11/2018 | Walthers | G06F 17/2705 |
| 2018/0365700 | A1* | 12/2018 | Walthers | G06Q 30/016 |
| 2018/0367480 | A1* | 12/2018 | Housman | G06N 20/00 |

OTHER PUBLICATIONS

Anonymous: "Watson-virtual-agents / virtual-agent-dialog. GitHub"; Sep. 13, 2016, pp. 1-11 (XP055518887); retrieved from the internet URL:https://github.com/watson-virtual-agents/virtual-agent-dialog/blob/9311c5a2d17fa72c4e74434667ff835cae0626f1/dialog-contract.md (retrieved on Oct. 25, 2018).

Srinivas Bangalore et al.; "Incremental parsing models for dialog task structure"; Mar. 30, 2009, pp. 94-102 (XP058361157).

Majdi Owda et al.; "Conversation-Based Natural Language Interface to Relational Databases"; Web Intelligence and Intelligent Agent Technology Workshops, 2007 IEEE/WIC/ACM International Conference, Nov. 2, 2007 ; pp. 363-367 (XP058391928).

\* cited by examiner

VIRTUAL AGENT CONVERSATION SERVICE

TECHNICAL FIELD

Embodiments described herein generally relate to cloud computing and in particular to virtual agent conversation services.

BACKGROUND ART

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or automating enterprise operations without maintaining network infrastructure and/or allocating computing resources normally associated with these functions.

Within the context of automating enterprise, IT, and/or other organization-related functions (e.g., human resources (HR)), PaaS often provides users an array of tools to implement complex behaviors, such as enterprise rules, scheduled jobs, events, and scripts, to build automated processes and to integrate with third party systems. Although the tools for PaaS generally offer users a rich set of facilities for building automated processes for various enterprise, IT, and/or other organization-related functions, users typically implement custom scripts to perform the automated process. Requiring customized script to build automated processes may pose a challenge when attempting to address abstraction (e.g., providing domain-appropriate building blocks), code reuse (e.g., having defined application program interface (API) semantics), and/or codeless development. As such, continually improving the technology of developmental platforms that simplify the process for a user to design and run automated processes remains valuable in enhancing clouding computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system that receives one or more conversation trees, the conversation tree associated with at least one or more intents and one or more actions. The system receives, from a virtual agent, a message from a user including a natural language description of an intended task. The system provides the message to a conversation provider. The system receives, from the conversation provider, an indication of an intent of the message and textual information related to the indication of the intent, wherein the intent is from the at least one or more intents. The system performs the action to obtain an action result. The system determines a set of responses based on the action result, and the system provides a response of the set of responses to the virtual agent based on the action results for output to the user.

In another embodiment, a method to improve a virtual agent conversation service. The method includes receiving one or more conversation trees, the conversation tree associated with at least one or more intents and one or more actions. The method also includes receiving, from a virtual agent, a message from a user including a natural language description of an intended task. The method also includes providing the message to a conversation provider. The method also includes receiving, from the conversation provider, an indication of an intent of the message and textual information related to the indication of the intent, wherein the intent is from the at least one or more intents. The method also includes determining an action to take based on the indication of the intent. The method also includes determining an action to take based on the indication of the intent. The method also includes performing the action to obtain an action result and providing a response of the set of responses to the virtual agent based on the action result for output to the user.

In yet another embodiment, computer readable medium containing instructions that, when executed by a processor cause a programmable device to receive one or more conversation trees, the conversation tree associated with at least one or more intents and one or more actions, receive, from a virtual agent, a message from a user including a natural language description of an intended task, provide the message to a conversation provider, receive, from the conversation provider, an indication of an intent of the message and textual information related to the indication of the intent, wherein the intent is from the at least one or more intents, determine an action to take based on the indication of the intent, perform the action to obtain an action result, determine a set of responses based on the action result, and provide a response of the set of responses to the virtual agent based on the action result for output to the user.

In yet another embodiment, a method to improve a virtual agent conversation service. The method includes providing a set of intents to a conversation provider, the set of intents based on catalog items, receiving, from a virtual agent, user input comprising a natural language request, providing the natural language request to the conversation provider, receiving, from the conversation provider, an intent, of the set of intents, of the natural language request and textual information related to the intent, determining a response based on the received intent and textual information, and providing the response to the user.

In yet another embodiment, a method to improve a virtual agent conversation service. The method includes receive a user notification, transmit the user notification to a virtual agent, determine, by the virtual agent, a notification channel for communicating the user notification, determine that the notification channel is capable of communication with the user, determine that the notification channel for communication the user notification is otherwise not configured for use by the system, and initiating a communication by transmitting, by the virtual agent, the user notification to the user using the determined notification channel.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "natural language" refers to any naturally arising human language. Natural languages may be used in many forms, including spoken or textual forms.

As used herein, the term "virtual agent" (VA) refers to an application configured to automatically conduct a conversation with users, and trigger business actions to fulfill their requests. As an example, a VA may be a virtual persona that serves as an online customer service representative. Natural language input from a user may be submitted to the VA and the VA may respond to the natural language input using a natural language response.

As used herein, the term "conversation provider" refers to services sufficient to provide a meaningful conversation with the user. These services may include machine learning capabilities along with natural language understanding, a dialog builder, and conversation state model. One example of a conversation provider is IBM Watson® (IBM WATSON is a registered trademark owned by International Business Machines Corporation).

As used herein, the term "intent" refers to a purpose or goal of a user input. Natural language processing may be used to extract one or more intents from user input. In some cases, the intent may be inferred from user input rather than directly stated in the user input. In certain cases, the conversation provider may be configured to recognize certain intents and respond to those recognized intents in specific ways. Unrecognized or unsupported intents may be handled as errors, such as with an indication that the user input was not understood or supported.

As used herein, the term "entity" refers to the item or concept that the intent is directed to. As an example, where a user input includes "check status of my request," the intent may be to check a status and the intent is directed to the user's request entity.

As used herein, the term "conversation tree" refers to a script-like set of responses or actions associated with a recognized intent. The conversation tree refers to a visual representation of the dialog model, in terms of the relationship between dialog nodes in a conversation. A conversation tree may be invoked when the recognized intent associated with the conversation tree is identified by the conversation provider. The VA may then respond to the user following the identified conversation tree.

As used herein, the term "action" refers to a script that is being run by the VA interface 306. The script is triggered by a response parameter returned by a dialog node being reached in the "conversation tree."

As used herein, the term "catalog" refers to a listing of one or more defined items, such as goods or services that may be provided. Catalog items may be discrete or bundled together to form a single item. Items may be selected and ordered. Items may be organized and stored, for example, in a database or other organizational data structure and the catalog may provide a structured view of the item. In certain cases, catalog items may be associated with information related to the catalog item, such as a description, various fields, prices, schedules, steps, sub-items, etc. This associated information may be defined per catalog item in a form. In certain cases a catalog may be configured to require certain associated information for certain catalog items.

Various example embodiments are disclosed herein that create and execute conversation trees and actions for a VA conversation service within a cloud computing environment. Virtual agents (VAs), also sometimes known as chatbots or bots, may be configured to not only converse with a user, but also to trigger actions on the user's behalf. As an example, a VA may be configured to trigger actions such as incident creation, knowledge base (KB) search, status checking, escalation to a live agent, or any another scripted action. The VA may then provide an indication of the action taken to the user as feedback. In certain cases, a particular action may require additional information and the VA may request this additional information from the user. A particular VA may be integrated with a conversation provider to converse with a user. The conversation provider may provide the content for a conversation with the user. The conversation provider may be a third party conversation provider. Actions and conversation trees may be provided to the conversation provider, for example, via a structured interchange format, such as JavaScript® Object Notation (JSON) (JAVASCRIPT is a registered trademark owned by Oracle America, Inc.). These actions and conversation trees may be provided by an administrator. In other cases, the actions and conversation trees may be generated automatically based on the catalog items available. In certain cases, a conversation, including action triggering and follow-up questions may be provided using one or more notification channels. Examples of such notification channels include messaging applications, instant messaging, short messaging service (SMS), email, etc.

Figure 1:
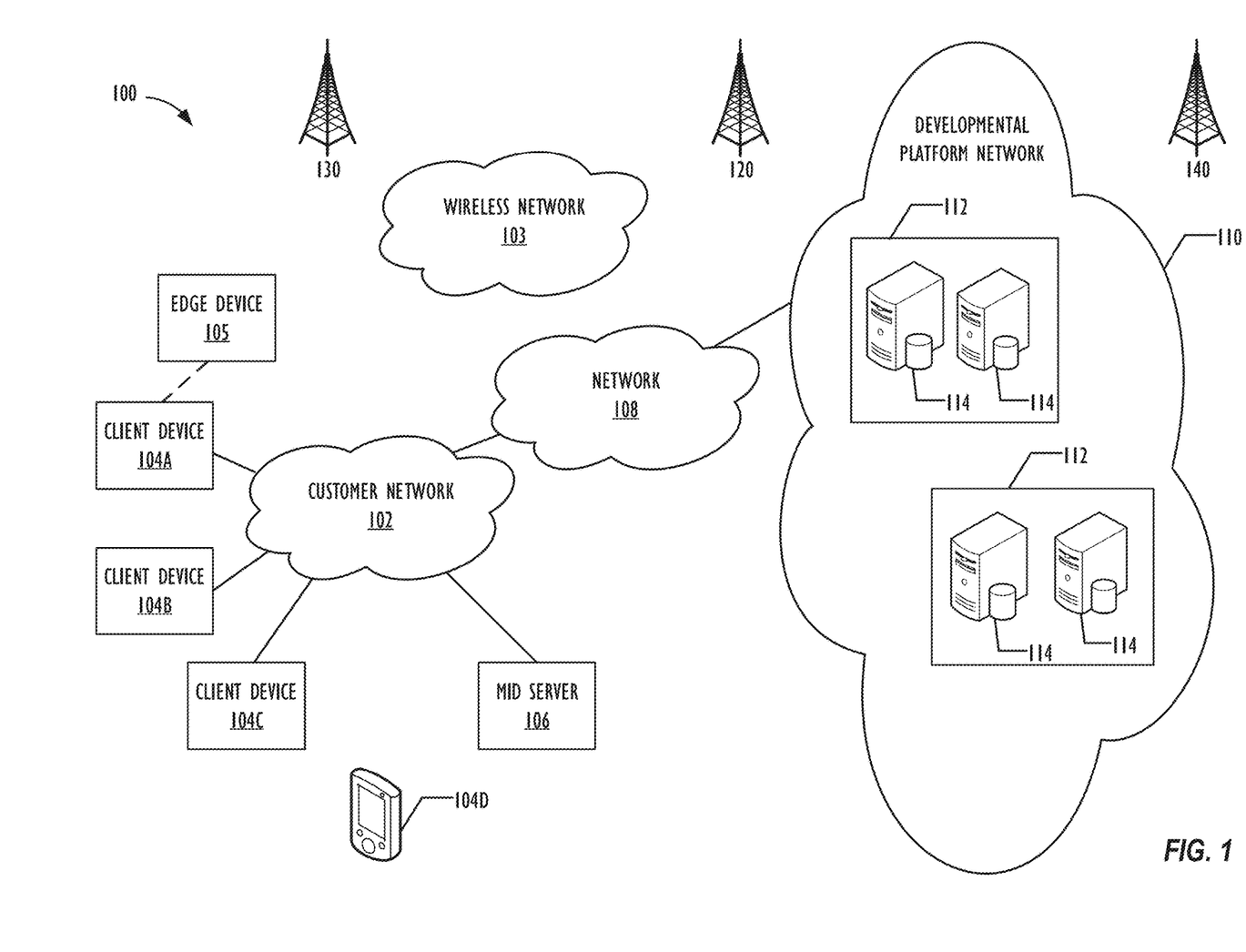
FIG. 1 illustrates a block diagram of an embodiment of a cloud computing infrastructure 100 where embodiments of the present disclosure may operate.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems, such as personal computers, portable devices, wireless devices, and/or other types of computing devices such as those referred to as Internet of Things that access cloud computing services, for example, via a web browser application or via an edge device 105 that may act as a gateway between the client device and the remote device. FIG. 1 also illustrates that the customer network 102 includes a management, instrumentation, and discovery (MID) server 106 that facilitates communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network), wireless fidelity (WiFi®) (WIFI is a registered trademark owned by WiFi Alliance Corporation)) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 is a remote network (e.g., a cloud network) that is able to communicate with the client devices 104A-C via the customer network 102 and network 108. The developmental platform network 110 provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Each of the data center 112 includes a plurality of server instances 114, where each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine), and/or a database server instance (e.g., a unitary MySQL® catalog (MySQL® is a registered trademark owned by MySQL AB A COMPANY)).

Figure 2:
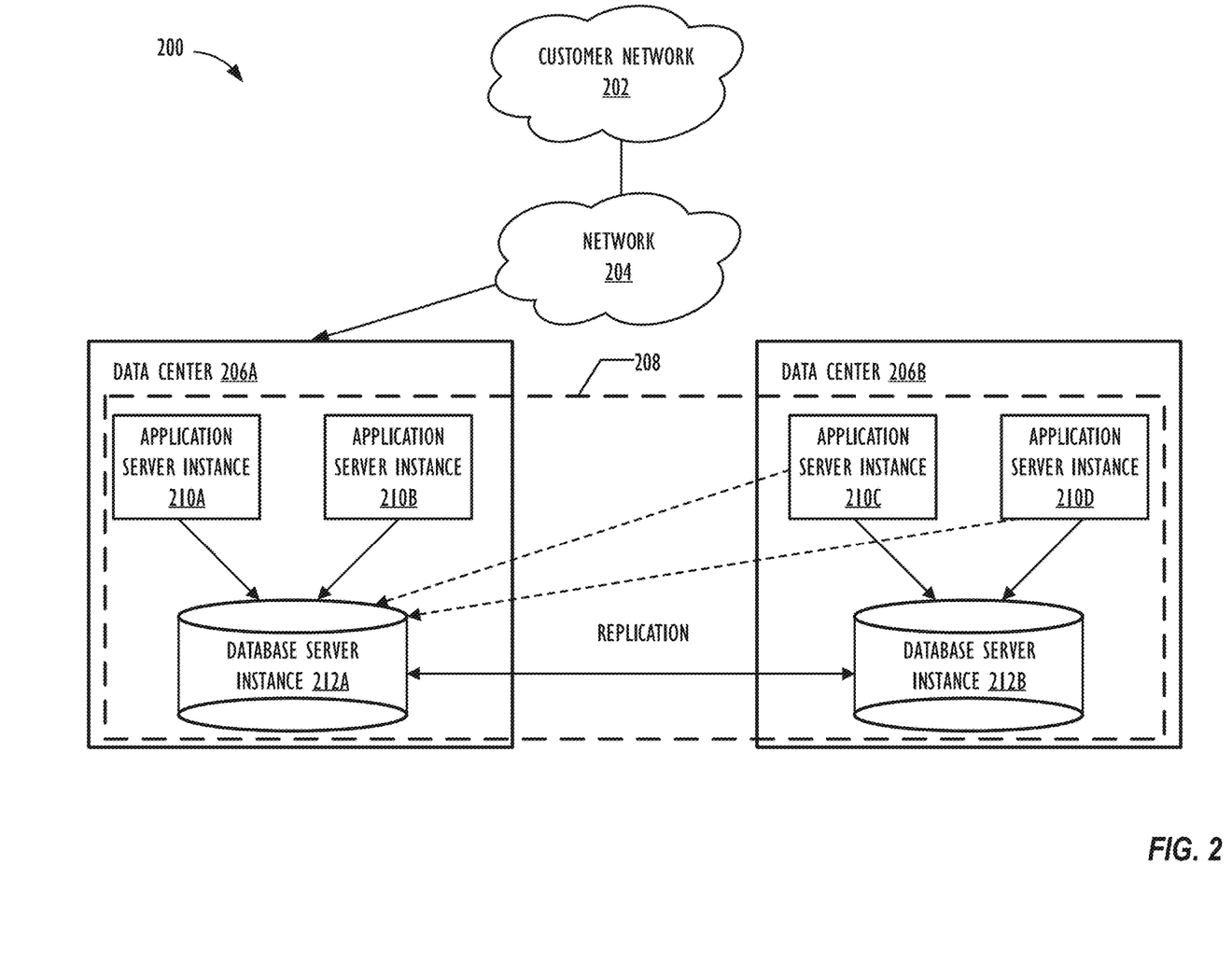
FIG. 2 illustrates a block diagram of an embodiment of a multi-instance cloud architecture 200 where embodiments of the present disclosure may operate.

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customer-driven upgrade schedules. An example of implementing a customer instance within a multi-instance cloud architecture will be discussed in more detail below when describing FIG. 2.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within developmental platform network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, the application server instances 210A-210D and database server instances 212A and 212B are allocated to two different data centers 206a and 206b, where one of the data centers 206 acts as a backup data center. In reference to FIG. 2, data center 206a acts as a primary data center 206a that includes a primary pair of application server instances 210A and 210B and the primary database server instance 212A for the customer instance 208, and data center 206b acts as a secondary data center 206b to back up the primary data center 206a for a customer instance 208. To back up the primary data center 206a for the customer instance 208, the secondary data center 206 includes a secondary pair of application server instances 210C and 210D and a secondary database server instance 212B. The primary database server instance 212A is able to replicate data to the secondary database server instance 212B. As shown in FIG. 2, the primary database server instance 212A replicates data to the secondary database server instance 212B using a Master-Master MySQL Binlog replication operation. The replication of data between data could be implemented by performing full backups weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if the application server instances 210A and 210B and/or primary data server instance 212A fails and/or is under maintenance, data traffic for customer instances 208 can be diverted to the secondary application server instances 210C and 210D and the secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of remote network infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation and are not intended to limit the disclosure to the specific examples.

Generally, a messaging interface may be provided to enable a user to communicate, for example, with an agent, such as a customer support representative. Messaging interfaces help enhance communications by allowing for a convenient form of communication without requiring the user accessing another communications medium. For example, a user on a website may be able to communicate with a customer support representative via a messaging interface without leaving the website, such as by switching to an email program or picking up a phone. Messaging interfaces may also help enhance live agent productivity as the live agent may be able to engage in multiple messaging conversations at the same time. Live agent productivity may be further enhanced through the use of VAs. For example, where the live agent understands that a user request may be able to be handled by a VA, the live agent may be able to hand off the user to the VA. The VA may then intake the user's issue and begin a conversation flow through the appropriate medium (e.g. email) to resolve the user's issue. In other cases, a user may be able to contact a VA initially.

If the VA is capable of handling the user request, then a live agent may not need to resolve the request. If the VA is not capable of handling the user request the user may be escalated to the agent. To help enhance the capabilities of the VA, the VA may be capable of taking certain actions beyond conversing with the user.

Figure 3:
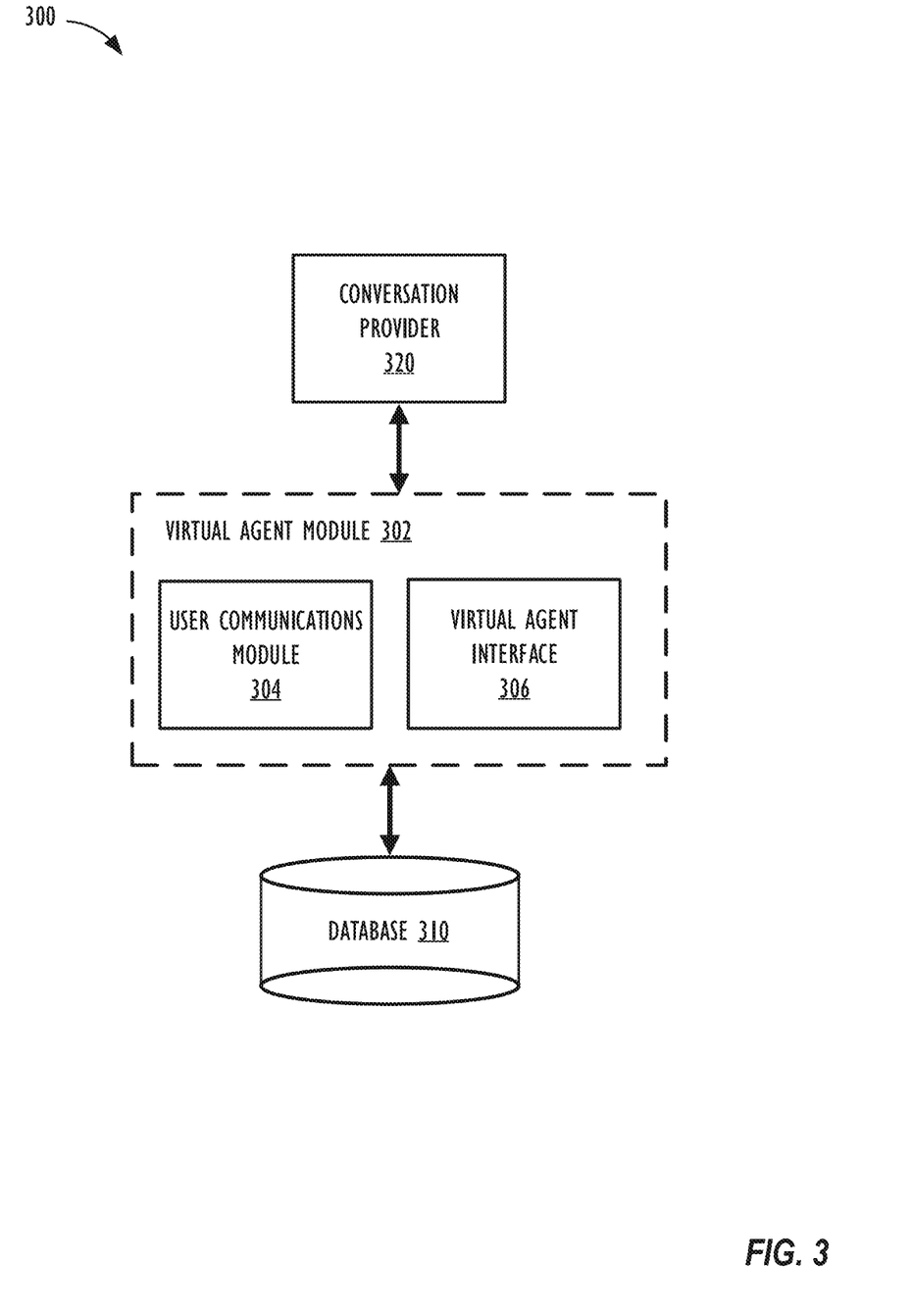
FIG. 3 illustrates a block diagram of an embodiment of a virtual agent (VA) conversation service 300, in accordance with aspects of the present disclosure.

FIG. 3 illustrates a block diagram of an embodiment of a VA conversation service 300, in accordance with aspects of the present disclosure. In certain cases, the VA conversation services 300 may run on an application server instance, such as one or more of application server instances 210A-210D. The VA conversation service 300 may include a VA module 302, which includes a user communications module 304, along with a VA interface 306. The user communications module 304 may provide a framework to provide general messaging services and features for the interface and messaging functionality. A VA may be configured to run on one or more application servers and may be triggered, for example, when a user input includes or indicates a request for support or a question, such as by clicking on a hyperlink or chat icon on a webpage. When a messaging conversation is initiated with a VA, the user communications module 304 may be called to setup the messaging conversation as well as invoke the VA. The VA interface 306 communicates with the user communications module 304 and may provide a local interface for constructing calls to a conversation provider 320. Where messaging message is received from a user for the VA, the message may be passed from the user communications module 304 to the VA interface 306, which packages the conversation into one or more appropriate calls for the conversation provider 320. For example, a user input may include a user message to an instance of a VA, such as "hello," and this user message may be formatted by the VA interface 306 and submitted to the conversation provider 320.

The conversation provider 320 communicates with the VA module 302 via the VA interface 306 and the conversation provider 320 may provide conversation services, such as parsing and analyzing user messages and providing a response. The conversation provider 320 may receive the user message from the VA interface 306, analyze the contents of the user message, and provide back to the VA interface 306 a response message. For example, the conversation provider 320 may processes the earlier "hello" user message and may return a response message, such as "Hi, how can I help you?" The conversation provider 320 may also be provided with certain words corresponding to intents or actions that the user communications module 304 supports. In certain cases, the conversation provider 320 may return an indication, such as a parameter, that may be used to trigger an action. The conversation provider 320 may also be provided with or may determine one or more synonyms for these intents or actions. The VA interface 306 may then pass the response message back to the user communications module 304, which may output the response message to the user.

In certain cases, the user communications module 304 may process responses and the Virtual Agent Interface 306 may invoke actions, if needed. The conversation provider 320 may be provided with one or more conversation trees. These conversation trees may be provided manually or programmatically by the Virtual Agent Module 302. The conversation trees may be a set of predefined questions, messages, or actions associated with a particular intent. The conversation provider 320 may be provided with one or more words corresponding to particular intents. The conversation provider 320 may return one or more indications of intent of a user message, along with textual information related to the indication, which may include the text of the reply or parameters of actions related to the indication. The conversation provider 320, in conjunction with the virtual agent interface 306, may recognize a particular intent is associated with a particular conversation tree and follow the conversation tree. Following the conversation tree may encompass, for example, providing a certain response, asking a question, making a decision based upon a response to a question, or taking a particular action. Invalid or nonsensical user messages may be handled by, for example, a response message indication that the user response was not understood or by disregarding the user response. Conversation trees may be defined by a user, such as an admin, or pre-configured out of the box. Conversation trees may be programmatically deployed to the conversation provider 320 by the virtual agent module 302. Additionally, conversation trees may be automatically defined based upon existing structured data in the system such as associated catalog items or surveys.

Figure 4:
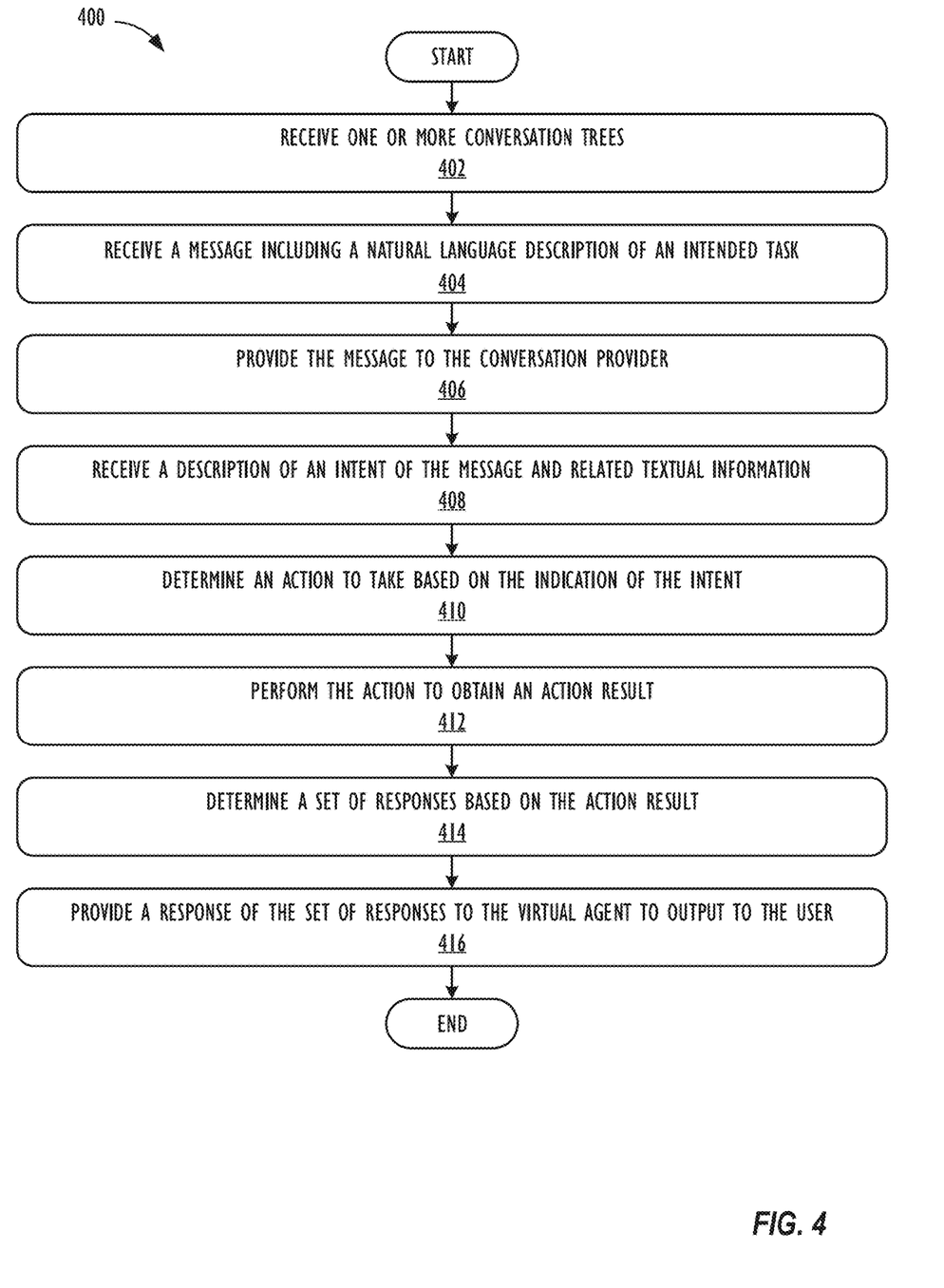
FIG. 4 is a flowchart of an embodiment of a method 400 for performing an action by a VA, in accordance with aspects of the present disclosure.

FIG. 4 is a flowchart of an embodiment of a method 400 for performing an action by a VA, in accordance with aspects of the present disclosure. The method 400 may be implemented, for example, by a computing device, such as any, or all, of applications server instances 210A-210D. At step 402, one or more conversation trees may be received. The conversation tree may be associated with one or more intents such that the conversation tree may be invoked if the one or more intents are detected in a user message by the conversation provider. For example, a particular conversation tree may be associated with a catalog item for an incident report with the action of creating the incident report. In some cases, the conversation tree may be dynamically created based on the existing catalog item or survey during configuration of the VA and associated conversation service. Configuration of the VA and associated conversation service may be triggered by an administrator or may be an automated process. This automated process may be manually triggered, automatically run, scheduled, or dynamically run. In other cases, a conversation tree may be partially populated. For example, information sufficient to associate a particular intent with a particular catalog item may be provided and then the rest of the conversation tree populated dynamically based on the order of fields in an associated form as needed. For example, the catalog item may be associated with a form having one or more fields. The set of responses may be based on the one or more fields of the form. In certain cases, the catalog item may include a field, such as a short description field, which may be used to confirm the user intent. After generation, the conversation tree may be sent for use by the conversation provider to provide a response to the user.

At step 404, a user message may be received from a user via the VA. The user message may be in a natural language format and may describe an intended task. For example, the VA may receive a user message asking the VA to "please create a ticket." At step 406, the user message may be provided to a conversation provider. The conversation provider may process the user message to determine the intent of the user message, along with an entity that the intent may be directed to. For example, the conversation provider may determine that the intent of the user is to create a record with the entity corresponding to a type of record to create, here an incident ticket. At step 408, the conversation provider returns an indication of the intent along with textual information related to the indication of the intent. The indication may be in any form, such as text corresponding to the intent, an intent code, or other codification of the intent. The textual information may include information related to the intent, including, for example, entity information, synonym information, sentiment information, etc. Response text may also be provided. At step 410, a determination of an action to take based on the indication of the intent may be made. In certain cases, the indication may be a parameter returned by the conversation provider. At step 412, the determined action may be performed and an action result may be returned based on results of the action. For example, where the conversation provider returns an indication of intent corresponding to creating a record with an associated entity object of an incident ticket, a dialog action script to create an incident ticket may be run and an action result indicating that the dialog action script ran successfully may be returned. At step 414, a set of responses based on the action result may be provided for output to the user. At step 416, a response from the set of responses may be provided to the VA for output to the user.

Figure 5:
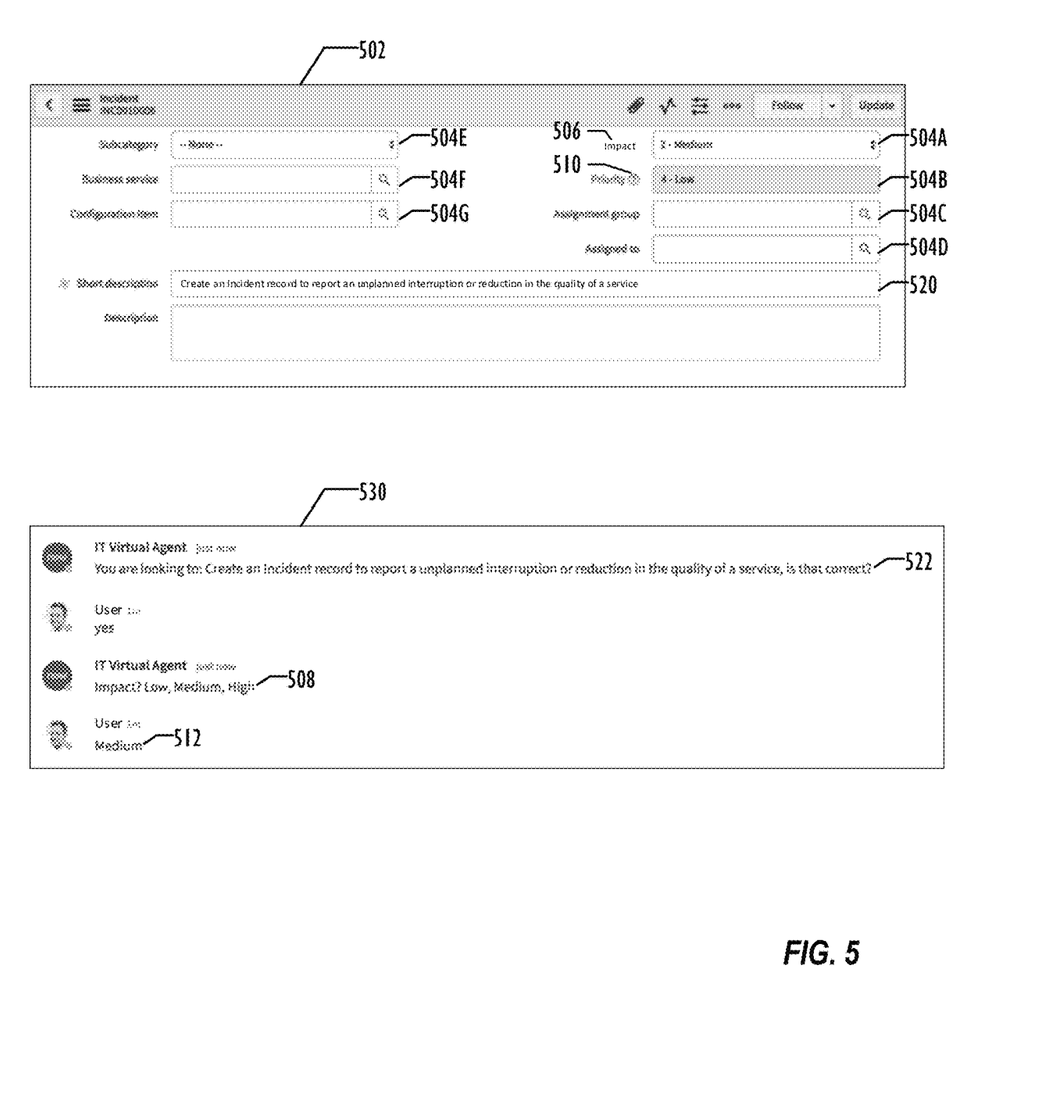
FIG. 5 illustrates dialog generation, in accordance with aspects of the present disclosure.

FIG. 5 illustrates dialog generation, in accordance with aspects of the present disclosure. Forms may exist for different information types, such as surveys or catalog items. Here, the form 502 requests information from the user for creating an incident ticket. The form 502 may contain one or more fields 504A-504G for structured data input from a user. The fields 504A-504G may be used to generate conversation messages for the user. Certain fields may be descriptive and these descriptions may be presented to the user as one or more messages. For example, a short description field 520 may be used to confirm the user intent and presented to the user prior to presenting the other fields, for example in message 522. Certain fields, such as variable fields, may request information. The label 506 of a field, such as field 504A, may be used to formulate question messages to the user. In certain cases, the label 506 may be converted into a question and presented to the user in a question message, such as with question message 508. Where the field, such as field 504A, includes items from which a user may select, the items may be converted into a text list and also presented to the user in a message, such as with question message 508. Where a field, such as 504B, is associated with descriptive text as indicated by symbol 510, the descriptive text may be used to formulate question messages to the user.

In certain cases a user's response to a question message requesting information may be subject to a set of validation rules. Forms may include structured data inputs that follow the set of validation rules. As an example of validation rules, certain fields may be required, fields, or field items, may vary based on responses to other fields, data types may be enforced, ordering may be specified, or another rule enforced. Validation rules may apply on a field by field basis, across multiple fields, or even for a whole form. In the incident ticket example, field 504A may be associated with a rule enforcing input of a value equal to either high, medium, or low. Rules associated with the field may be used to validate the user's response 512 to the question message 508. For example, if the user response to question message 508 is anything other than an item associated with field 504A, the user response may be rejected and question message 508 may be presented again. Where a field is not required, a user may be able to skip responding to the associated question message. Ordering of the fields may also be enforced.

Validated user responses may be captured and entered to their corresponding fields in a record. In the incident ticket example, once validated responses have been received for the required fields, an incident ticket record may be opened and the field values stored. In certain cases, a record may be opened as the conversation progresses and field values recorded as they are validated. Additional information such as the conversation history may be added into the records as well. In certain cases, an action may be performed once sufficient information is captured, such as for example, resetting a password, unlocking an account, or other action.

A user response may also be handled using non-messaging based services. For example, a user may email a request to a helpdesk. This creates a record, which can be assigned to a VA. The VA may then respond in a manner similar to the messaging case, but using email to send comments back to the user. The VA may then receive additional comments from the user and so forth. More generally, the VA may respond using whatever notification channel is designated for use by the user or even all notification channels associated with the user.

In certain cases, notifications for a user may be sent to a user via a notification channel available to the VA, even if the user has not previously interacted or contacted the VA. For example, a user may have created an incident via a website or other method either using the VA or without using the VA. A notification regarding the incident may then become available, such as if progress is made on resolving the incident. The user may be associated with certain notification channels, such as messaging, SMS, email, Facebook® (FACEBOOK is a registered trademark owned by Facebook, Inc), Slack® (SLACK is a registered trademark owned by Slack Technologies, Inc.), or other communications service available to the VA. This notification may be output to the VA and the VA may send the notification to the user via the associated notification channel. The notification channels associated with a user may be user configurable and priority for the notification channels may be designated. After the user receives the notification via the VA, the user may then continue to interact with the VA, for example, by sending a user message to the VA. In certain cases, a cloud computing system hosting the VA may not be configured to use certain notification channels available to the VA. In these cases, the VA may provide access to notification channels not otherwise available to the cloud computing system.

According to certain aspects, a VA and associated conversation service may be configured using an automated process rather than manually by an administrator. During an automated configuration, catalog items may be populated to the conversation service. In addition, form based surveys may be abstracted into chat based conversation questions. For example, each catalog item in a service catalog may be queried. Catalog items may also be parsed based on variables associated for the catalog item. For example, forms built by variables associated with certain catalog items, may be parsed to create conversation trees. Common words, stop words, and duplicate words may be removed. Numbers may also be removed. The resulting set of words may be associated with the catalog item and then pushed to the conversation service dynamically, such as on a schedule, as items change, etc. A user may then be able to request these catalog items, for example, by expressing an intent or entity related to the set of words. Instead of filling out a form, the user can go through the fields as a series of conversation questions.

Figure 6:
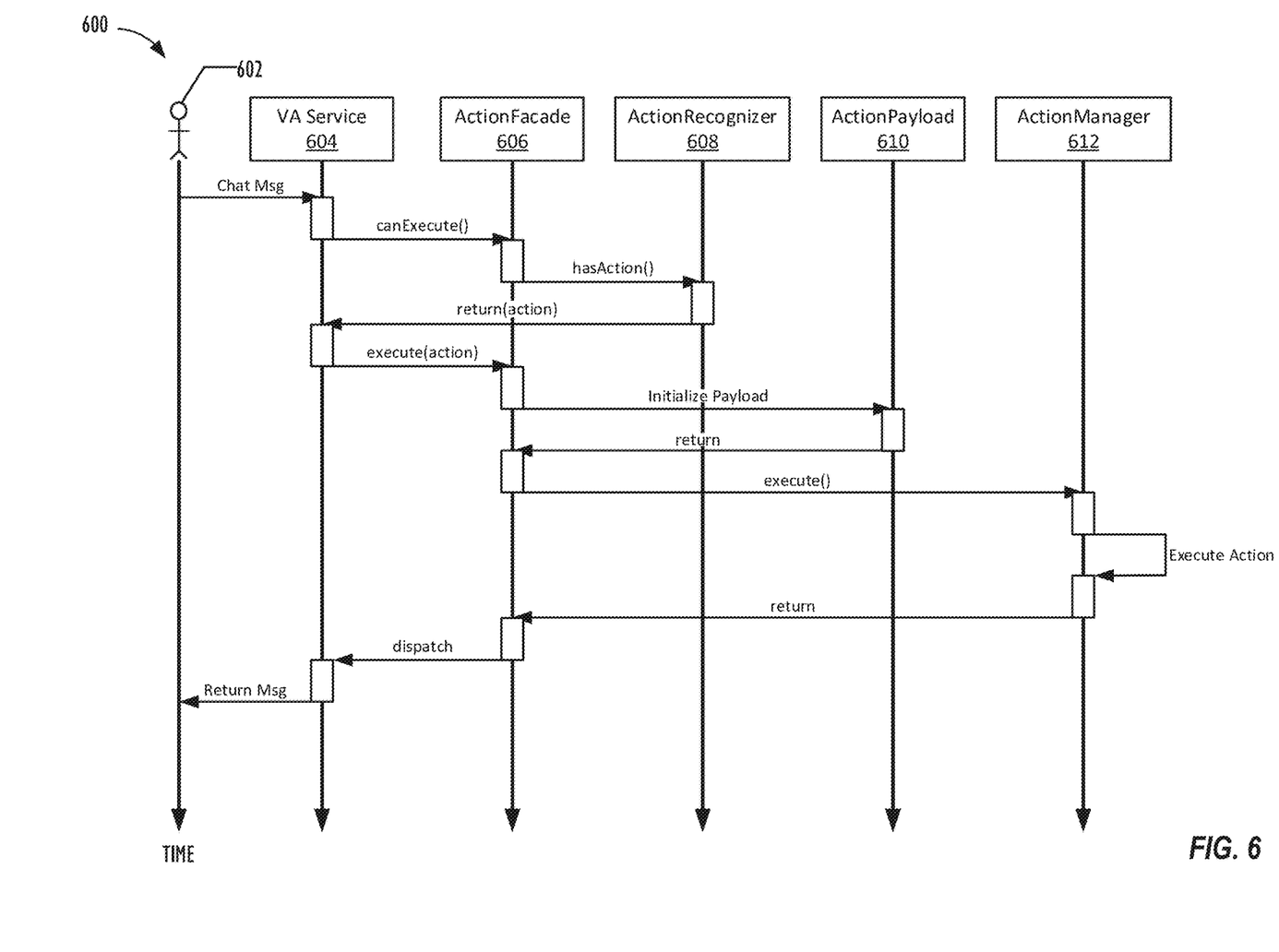
FIG. 6 illustrates a callflow 600, in accordance with aspects of the present disclosure.

FIG. 6 illustrates a callflow 600, in accordance with aspects of the present disclosure. A framework for executing actions using a VA may include an ActionFacade 606, ActionRecognizer 608, ActionPayload 610, and ActionManager 612, which interact with a VA Service 604 and user 602. The process callflow starts after the VA Service 604 sends a message, such as a chat message, from the user 602 to the conversation provider. After the conversation provider responds, the ActionFacade 606 processes the response from the conversation provider. The VA Service 604 handles the session management and conversation state during the lifecycle of the conversation. In certain cases, the framework may be a part of, or utilized by, the user communications module and/or the VA interface. The ActionFacade 606 may generally manage the process of recognizing that an action should be taken during a conversation and executing that action using parameters provider by the user via the VA service 604. The ActionFacade 606 may be a class for abstracting the execution of an action if the action is recognized. The ActionRecognizer 608 may be a class for abstracting the detection of whether the action can be triggered for a user response. The ActionPayload 610 is a class for normalizing the response of the conversation provider to objects that the other classes can understand. The ActionManager 612 may be a class that manages the execution of the action. Generally for each conversation turn, an object representing the user response, as processed by the conversation provider, is evaluated by the ActionFacade 606 to determine whether an action should be taken. The ActionFacade 606 may act as an abstraction layer and call the ActionRecognizer 608, which may detect whether and which action is appropriate based on the user response. The ActionRecognizer 608 may also detect whether there are any requirements that must be met prior to execution. If an action is appropriate the ActionFacade 606 may encode the action payload indicating the action to be taken and any necessary information. This encoded action may be passed to the ActionManager 612, which may manage the association of the action payload to the action record in the database. The ActionManager 612 may also handle executing the workflow action specified, processing any script actions, constructing a response message, or another part of executing the action payload.

According to aspects of the present disclosure, where multiple users are conversing with different instances of one or more VA's, multiple incidents may be generated. These incidents may be compared with each other and a single workflow may be created to resolve both incidents, if the information provided indicates the two incidents are similar. This workflow may be automatically routed to one or more live agents. The live agents may have previously indicated an ability to handle such incidents.

Figure 7:
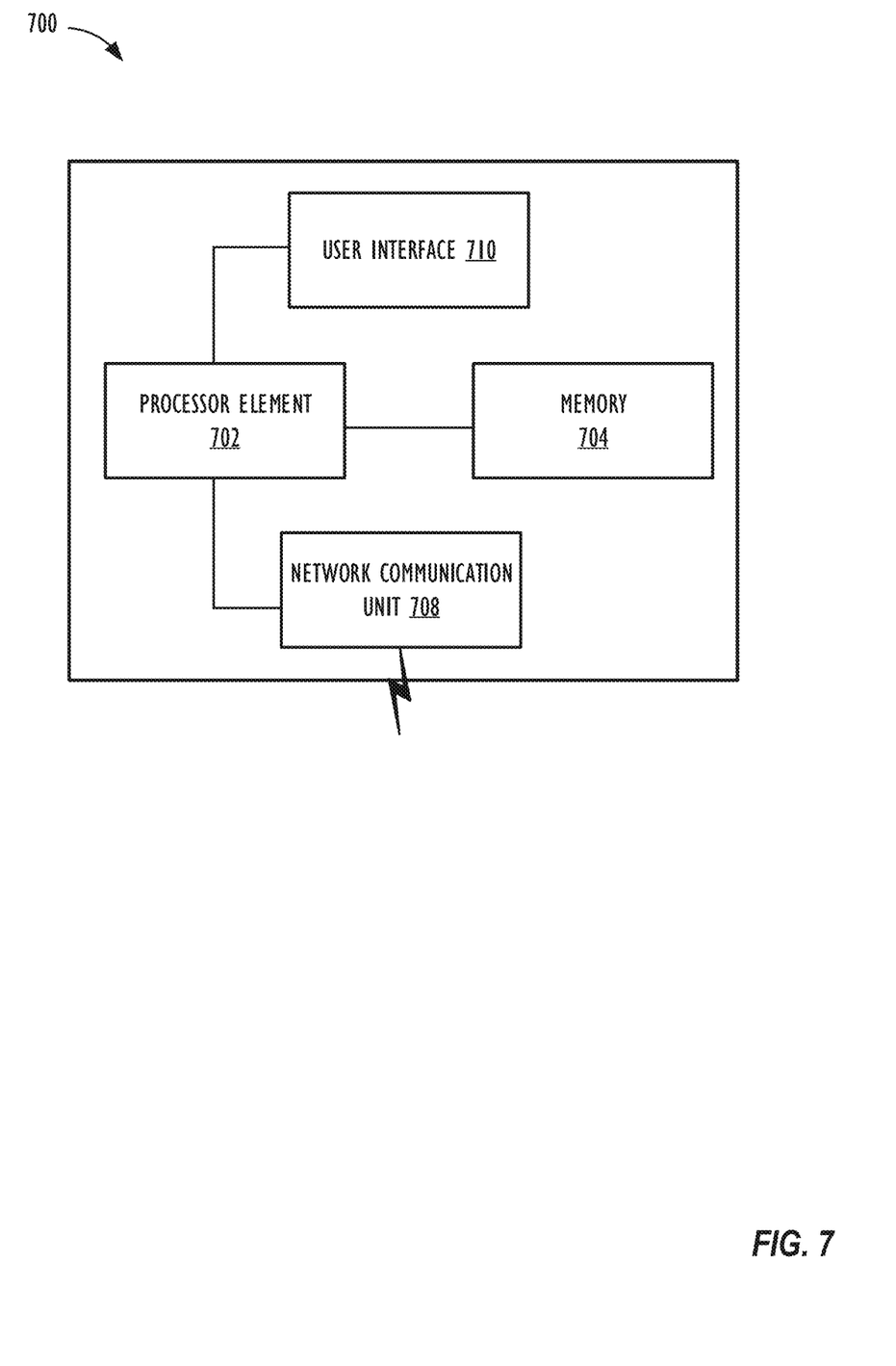
FIG. 7 is a block diagram illustrating another embodiment of computing system 700 for use with techniques described herein.

Referring now to FIG. 7, a block diagram illustrates a computing device 700 that may be used for implementing the techniques described herein in accordance with one or more embodiments (e.g., VA conversation service 300, developmental platform 600, flow engine 314, flow engine 614, and method 400). For example, the computing device 700 illustrated in FIG. 7 could represent a client device or a physical server device. As shown in FIG. 7, the computing device 700 can include can also include one or more input/output devices, such as a network communication unit 708 that could include a wired communication component and/or a wireless communications component 290, which can be coupled to processing element 702. The network communication unit 208 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi®, and/or other communication methods.

The computing system 700 includes a processing element 702 that contains one or more hardware processors, where each hardware processor may have a single or multiple processor cores. In one embodiment, the processing element 702 may include at least one shared cache that store data (e.g., computing instructions) that are utilized by one or more other components of processing element 702. For example, the shared cache may be locally cache data stored in a memory for faster access by components of the processing elements 702. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 7, the processing element 702 may also include one or more other types of hardware processing components, such as graphics processing units (GPU), application specific integrated circuits (ASICs), field-programmable gate arrays (FPGAs), and/or digital signal processors (DSPs).

FIG. 7 illustrates that memory 704 may be operatively coupled to processing element 702. Memory 704 may be a non-transitory medium configured to store various types of data. For example, memory 704 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 702. In one embodiment, the compiling process of the software program may transform program code written in a programming language to another computer language such that the processing element 702 is able to execute the programming code. For example, the compiling process of the software program may generate an executable program that provides encoded instructions (e.g., machine code instructions) for processor 702 to accomplish specific, non-generic, particular computing functions.

After the compiling process, the encoded instructions may then be loaded as computer executable instructions or process steps to processing element 702 from storage (e.g., memory 704) and/or embedded within the processing element 702 (e.g., cache). Processing element 702 can execute the stored instructions or process steps in order to perform instructions or process steps to transform the computing device into a non-generic, particular, specially programmed machine or apparatus. Stored data, e.g., data stored by a storage device, can be accessed by processing element 702 during the execution of computer executable instructions or process steps to instruct one or more components within the computing device 700.

A user interface 710 can include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7. For ease of discussion, FIG. 7 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system, comprising:
   one or more non-transitory memory devices; and
   one or more hardware processors configured to execute instructions from the one or more non-transitory memory devices to cause the system to:
   generate a conversation tree based on one or more forms, wherein the one or more forms comprise a catalog item or a survey, wherein the conversation tree is associated with at least one or more intents and one or more actions, wherein generating the conversation tree comprises:
   determining a set of catalog items available, wherein the set of catalog items comprises the catalog item;
   generating a set of entities based on a set of words associated with the catalog item;
   determining one or more variables associated with the catalog item; and
   generating the conversation tree based on the catalog item, the set of entities, and the one or more variables;
   provide, to a conversation provider, the conversation tree;
   receive, via a virtual agent, a message from a user including a natural language description of an intended task;
   provide the message to the conversation provider;
   receive, from the conversation provider, an indication of an intent of the message and textual information related to the indication of the intent, wherein the intent is from the at least one or more intents;
   invoke the conversation tree to determine an action to take based on the indication of the intent; perform the action to obtain an action result;
   determine a set of responses based on the action result; and
   provide a response of the set of responses to the virtual agent based on the action result for output to the user.

2. The system of claim 1, wherein the indication of the intent comprises a parameter and wherein the action comprises running a script associated with the action.

3. The system of claim 1, wherein the instructions are further configured to cause the system to:
   determine validation rules based on a set of behavioral rules associated with the one or more forms and wherein the provided response is selected from the set of responses;
   receive a user response to the provided response;
   determine the user response is a valid response based on the validation rules; and
   associate the user response with a corresponding field of the one or more forms.

4. The system of claim 1, wherein the message is received as an email message and the response is provided as a reply to the email message.

5. The system of claim 1, wherein the instructions are further configured to cause the system to:
   receive a user notification for outputting to the user;
   determine a notification channel for communicating the user notification, wherein the virtual agent supports the notification channel; and
   transmit, by the virtual agent, the user notification using the determined notification channel.

6. The system of claim 5, wherein the notification channel comprises multiple notification channels and transmitting the user notification comprises transmitting the user notification on the multiple notification channels.

7. The system of claim 1, wherein the response comprises a confirmation question for the intent based on a field description on the one or more forms.

8. The system of claim 1, wherein the instructions are further configured to cause the system to:
   generate a plurality of conversation trees, including the conversation tree, based on the one or more forms; and
   identify the conversation tree from the plurality of conversation trees, as associated with the intent.

9. The system of claim 1, wherein generating the conversation tree comprises:
   parsing a plurality of catalog items based on variables associated with each catalog item of the plurality of catalog items, wherein each catalog item is associated with a corresponding form built by the associated variables;

generating a plurality of conversation trees including the conversation tree, wherein each conversation tree of the plurality of conversation trees is associated with a corresponding catalog item.

10. A method for improving a virtual agent conversation service, comprising:

generating a conversation tree based on one or more forms, wherein the one or more forms comprise a catalog item or a survey, wherein the conversation tree is associated with at least one or more intents and one or more actions, wherein generating the conversation tree comprises:

determining a set of catalog items available, wherein the set of catalog items comprises the catalog item;

generating a set of entities based on a set of words associated with the catalog item of the set of catalog items;

determining one or more variables associated with the catalog item; and generating the conversation tree based on the catalog item, the set of entities, and the one or more variables;

providing, to a conversation provider, the conversation tree;

receiving, via a virtual agent, a message from a user including a natural language description of an intended task;

providing the message to the conversation provider;

receiving, from the conversation provider, an indication of an intent of the message and textual information related to the indication of the intent, wherein the intent is from the at least one or more intents;

invoking the conversation tree to determine an action to take based on the indication of the intent;

performing the action to obtain an action result;

determining a set of responses based on the action result; and providing a response of the set of responses to the virtual agent based on the action result for output to the user.

11. The method of claim 10, wherein the indication of the intent comprises a parameter and wherein the action comprises running a script associated with the action.

12. The method of claim 10, further comprising:

determining validation rules based on a set of behavioral rules associated with a form of the one or more forms and wherein the provided response is selected from the set of responses;

receiving a user response to the provided response;

determining the user response is a valid response based on the validation rules; and associating the user response with a corresponding field of the form.

13. The method of claim 10, wherein the message is received as an email message and the response is provided as a reply to the email message.

14. The method of claim 10, further comprising:

receiving a user notification for outputting to the user;

determining a notification channel for communicating the user notification, wherein the virtual agent supports the notification channel; and transmitting, by the virtual agent, the user notification using the determined notification channel.

15. The method of claim 14, wherein the notification channel comprises multiple notification channels and transmitting the user notification comprises transmitting the user notification on the multiple notification channels.

16. The method of claim 10, wherein the response comprises a confirmation question for the intent based on a field description on the form.

17. A non-transitory computer readable medium containing instructions that, when executed by a processor cause a programmable device:

generate a conversation tree based on one or more forms, wherein the one or more forms comprise a catalog item or a survey, wherein the conversation tree is associated with at least one or more intents and one or more actions, wherein generating the conversation tree comprises:

determining a set of catalog items available, wherein the set of catalog items comprises the catalog item;

generating a set of entities based on a set of words associated with the catalog item;

determining one or more variables associated with the catalog item; and generating the conversation tree based on the catalog item, the set of entities, and the one or more variables;

provide, to a conversation provider, the conversation tree;

receive, via a virtual agent, a message from a user including a natural language description of an intended task;

provide the message to the conversation provider;

receive, from the conversation provider, an indication of an intent of the message and textual information related to the indication of the intent, wherein the intent is from the at least one or more intents;

invoke the conversation tree to determine an action to take based on the indication of the intent;

perform the action to obtain an action result;

determine a set of responses based on the action result; and provide a response of the set of responses to the virtual agent based on the action result for output to the user.

18. The non-transitory computer readable medium of claim 17, wherein the indication of the intent comprises a parameter and wherein the action comprises running a script associated with the action.

* * * * *